US011187328B2

United States Patent
Kuhlman et al.

(10) Patent No.: US 11,187,328 B2
(45) Date of Patent: *Nov. 30, 2021

(54) ATTENUATION ELEMENT FOR USE WITH VALVES

(71) Applicant: FISHER CONTROLS INTERNATIONAL LLC, Marshalltown, IA (US)

(72) Inventors: Charles R. Kuhlman, Marshalltown, IA (US); Andrew M. Prusha, Marshalltown, IA (US); Billy R. Flowers, Marshalltown, IA (US); David S. Scheffert, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,046

(22) Filed: Mar. 27, 2020

(65) Prior Publication Data
US 2020/0224775 A1 Jul. 16, 2020

Related U.S. Application Data

(63) Continuation of application No. 15/784,080, filed on Oct. 13, 2017, now Pat. No. 10,724,643.
(Continued)

(51) Int. Cl.
*F16K 47/08* (2006.01)
*F16K 5/06* (2006.01)

(52) U.S. Cl.
CPC ............ *F16K 5/0605* (2013.01); *F16K 47/08* (2013.01)

(58) Field of Classification Search
CPC .................................. F16K 5/0605; F16K 47/08
See application file for complete search history.

(56) References Cited

U.S. PATENT DOCUMENTS

| 3,591,129 A ‡ | 7/1971 | Hulsey .................. F16K 5/0605 251/11 |
| 4,007,908 A ‡ | 2/1977 | Smagghe ................ F16K 47/08 251/12 |

(Continued)

FOREIGN PATENT DOCUMENTS

EP 2690333 A1 ‡ 1/2014

OTHER PUBLICATIONS

Written Opinion for PCT/US2017/056311, dated Jan. 24, 2018.‡
Search Report for PCT/US2017/056311, dated Jan. 24, 2018.‡

*Primary Examiner* — Kevin L Lee
(74) *Attorney, Agent, or Firm* — Marshall, Gerstein & Borun LLP

(57) ABSTRACT

A control valve includes a valve body, a valve seat, and a valve closure member displaceable a closed position and an open position. An attenuation element is provided and includes a plurality of hollow tubes including a first tube, a second tube and a third tube. Each tube includes a flow axis from an open first end to an open second end, and an inner surface defining a flow area and having a cross-sectional shape normal to the flow axis. A second end of the tubes is between the valve closure member and first ends of the tubes along their respective flow axes when the valve closure member is closed. The first tube, the second tube, and the third tube are integrally formed as a single, unitary structure.

20 Claims, 12 Drawing Sheets

Related U.S. Application Data

(60) Provisional application No. 62/408,447, filed on Oct. 14, 2016.

(56) References Cited

U.S. PATENT DOCUMENTS

| | | | | |
|---|---|---|---|---|
| 4,085,774 | A | ‡ | 4/1978 | Baumann .................. F16K 3/34 137/62 |
| 5,070,909 | A | ‡ | 12/1991 | Davenport ............ F16K 5/0605 137/62 |
| 5,772,178 | A | ‡ | 6/1998 | Bey ....................... F16K 47/045 138/42 |
| 5,988,586 | A | ‡ | 11/1999 | Boger ..................... F16K 47/08 138/42 |
| 7,845,688 | B2 | | 12/2010 | Gallagher et al. |
| 10,724,643 | B2 | * | 7/2020 | Kuhlman et al. ..... F16K 5/0605 |
| 2005/0199298 | A1 | ‡ | 9/2005 | Farrington .............. F16K 47/08 137/62 |
| 2009/0184277 | A1 | ‡ | 7/2009 | Song ..................... F16K 47/045 251/31 |
| 2010/0258193 | A1 | | 10/2010 | Christenson et al. |

\* cited by examiner
‡ imported from a related application

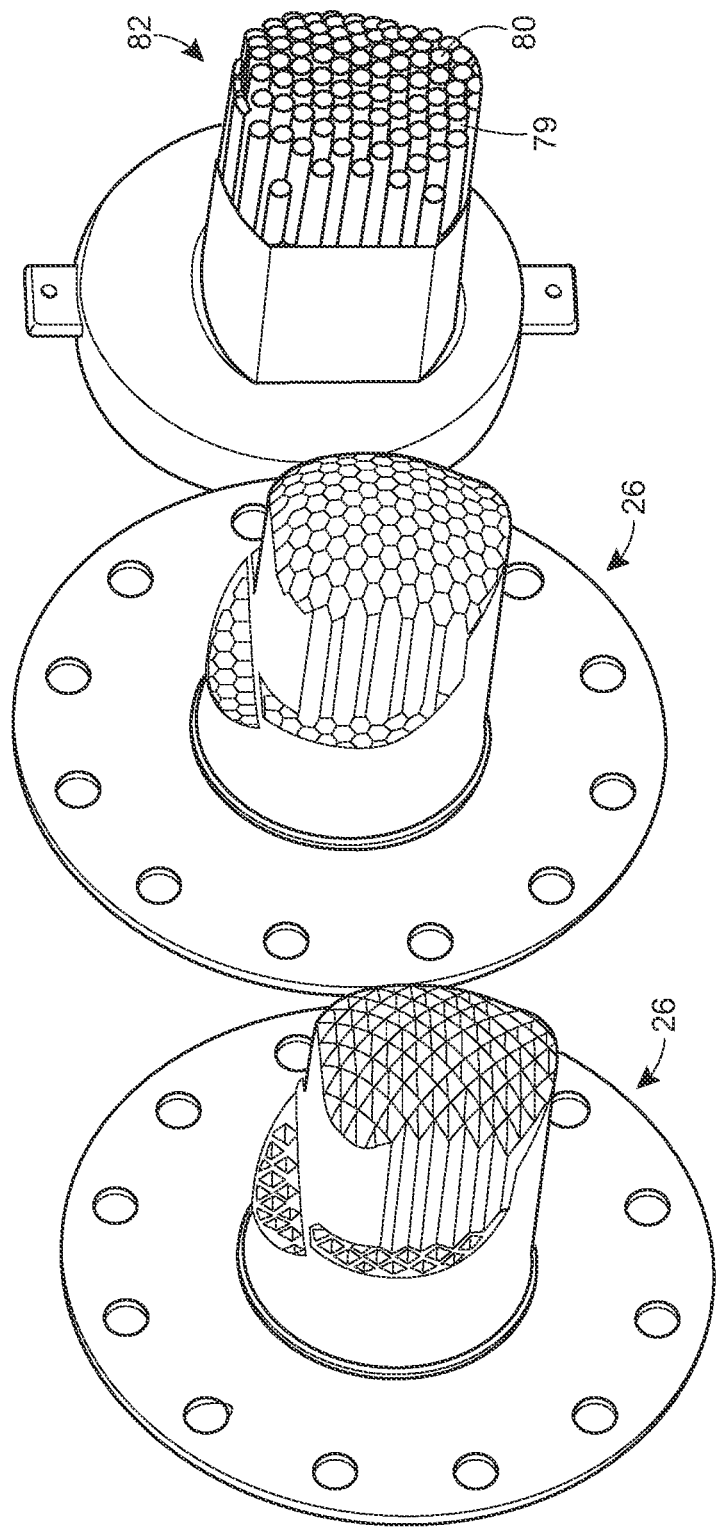

ATTENUATION ELEMENT FOR USE WITH VALVES

FIELD OF THE DISCLOSURE

This disclosure relates generally to valves, and more particularly, to an attenuation element for use with valves.

BACKGROUND

In some valves, such as ball valves, fluid flowing through the valve may be subject to rapid changes in pressure, and this rapid pressure change in the fluid may result in the formation of vapor cavities in low-pressure portions of the fluid, a phenomenon known as cavitation. When the vapor cavities in the fluid are subjected to higher pressure, the vapor cavities implode and can generate an intense shock wave that can damage internal portions of the valve.

In valve embodiments in which cavitation is a danger, cavitation/aerodynamic control devices may be disposed in or adjacent to the inlet such that when the ball valve is in an open position, fluid flows from the inlet to the outlet through the cavitation/aerodynamic control device. The cavitation/aerodynamic control device may slow and/or isolate segments of fluid flow through the valve to slow the pressure reduction and/or increase in the fluid, thereby eliminating (or reducing the likelihood) of low-pressure areas in which vapor cavities can occur in the fluid. As a consequence, hydrodynamic noise may also be attenuated by the device.

In typical cavitation/aerodynamic control device assembly (such as the Emerson® Cavitrol® V tube bundle which is illustrated in FIG. 13C), a plurality of austenitic stainless steel tubes were bundled together, and the plurality of tubes was then surrounded by a metal shroud. The assembly may be vacuum brazed with, for example, a powdered metal paste silver brazing material (such as AWS A5.8 BAg-1). A flange may also be welded to the shroud to simplify mounting to a portion of pipe. However, with so many parts (e.g., typically over 300 tubes), the assembly is time consuming—and therefore expensive—to produce. In addition, such a tubing assembly is very difficult to produce with conventional manufacturing process (such as casting) and is cost prohibitive to machine with wire or ram-type electrical discharge machining. Accordingly, thicker tubes than optimally desired are used, and the effectiveness at reducing or eliminating cavitation is reduced while material cost is increased.

SUMMARY

In accordance with a first exemplary aspect, a control valve includes a valve body, a valve seat, and a valve closure member displaceable a closed position and an open position. An anti-cavitation element is provided and includes a plurality of hollow tubes including a first tube, a second tube and a third tube. Each tube includes a flow axis from an open first end to an open second end, and an inner surface defining a flow area and having a cross-sectional shape normal to the flow axis. A second end of the tubes is between the valve closure member and first ends of the tubes along their respective flow axes when the valve closure member is closed. The first tube, the second tube, and the third tube are integrally formed as a single, unitary structure.

In accordance with a second exemplary aspect, an anti-cavitation element is adapted for use with a valve assembly having a valve body, an inlet, an outlet, a valve seat, and a valve closure member shiftable between a first closed position and a second fully-open position. A plurality of hollow tubes includes a first, second and third tubes extending along first, second and third flow axes, respectively, from open first ends to open second ends, with each tune having an inner surface that defining a flow area, and inner surfaces having a cross-sectional shape normal to their respective flow axes. The second end of the tubes is between a portion of the valve closure member and the first end of the tubes when the valve closure member in the closed position, and the first tube, the second tube, and the third tube are integrally formed as a single, unitary structure.

In further accordance with any one or more of the foregoing exemplary aspects, an anti-cavitation element and/or a control valve with such an anti-cavitation element may further include any one or more of the following preferred forms.

In one preferred form, the flow axes are linear, and/or the flow axes are parallel.

In one preferred form, the cross-sectional shapes are identical.

In one preferred form, the cross-sectional shapes are constant along the respective flow axes.

In one preferred form, the ends of the tubes may be aligned along a reference plane extending normal to the first flow axis.

In one preferred form, the reference plane intersects a portion of an annular flange disposed around the plurality of hollow tubes, the flange being integrally formed with the first tube, the second tube, and the third tube to form a single, unitary structure.

In one preferred form, the cross-sectional shapes are polygonal.

In one preferred form, the polygonal shape is one of a hexagon, a diamond, or a rhombus.

In one preferred from, the cross-sectional shape is a non-circular shape.

In one preferred form, the first, second, and/or third tubes may have different distances, and/or the first distance is less than the second distance, and the second distance is less than the third distance.

In one preferred form, the second end of the first tube is at least partially defined by an annular first front surface, the second end of the second tube is at least partially defined by an annular second front surface, and the second end of the third tube is at least partially defined by an annular third front surface, wherein the first front surface, the second front surface, and the third front surface are each non-planar.

In one preferred from, the first front surface, the second front surface, and the third front surface cooperate to have a shape of a portion of a sphere.

BRIEF DESCRIPTION OF THE DRAWINGS

FIG. 13A is an isometric view of an embodiment of an anti-cavitation element;

FIG. 13B is an isometric view of an embodiment of an anti-cavitation element; and FIG. 13C is an isometric view of an example prior art embodiment of an anti-cavitation element.

DETAILED DESCRIPTION

Figure 1:
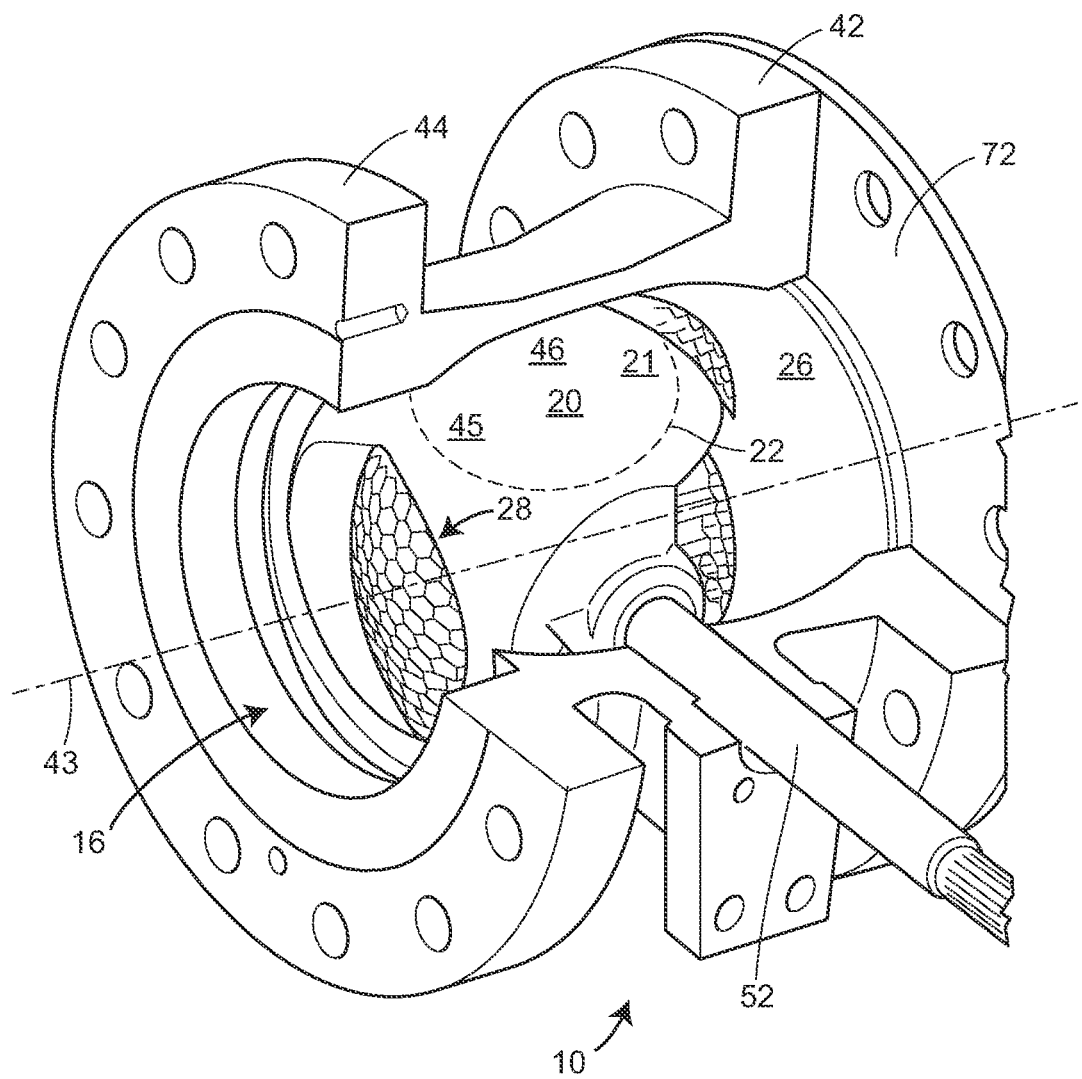
FIG. 1 is an isometric and partial sectional view of an embodiment of a valve assembly with the valve closure member in a fully-open position.
Figure 2:
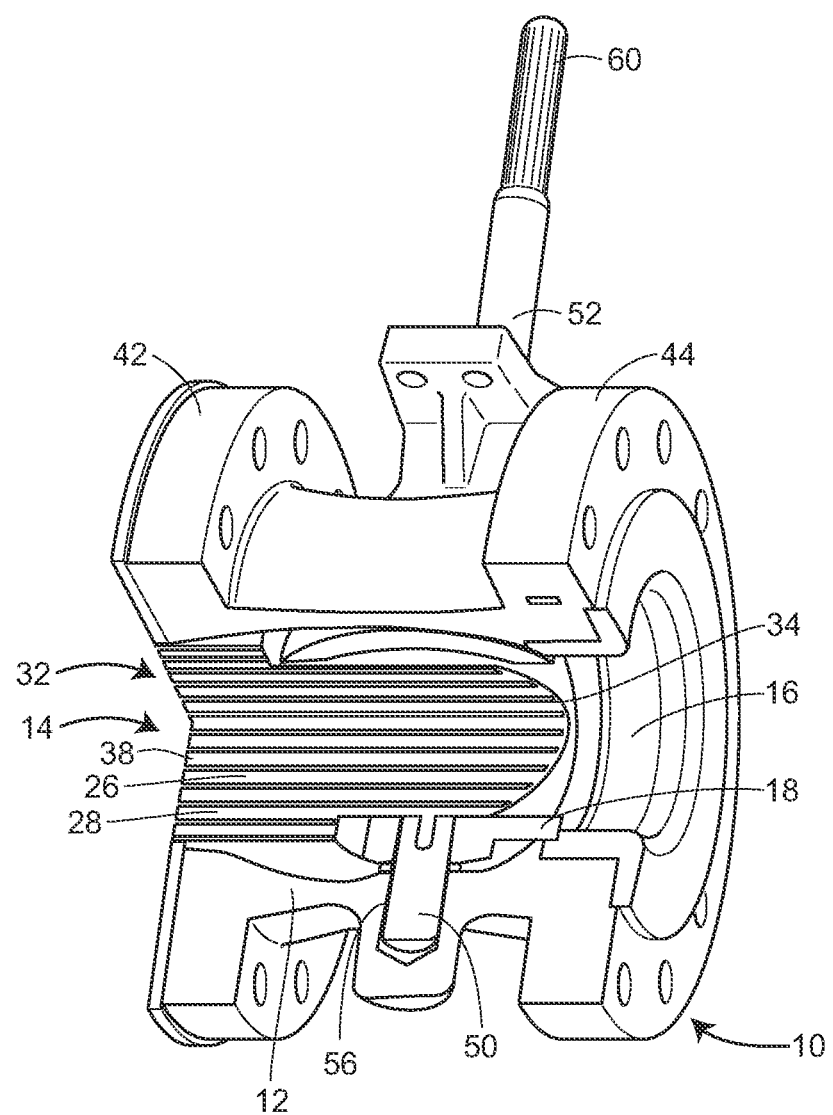
FIG. 2 is an isometric and partial sectional view of the embodiment of FIG. 1.
Figure 3:
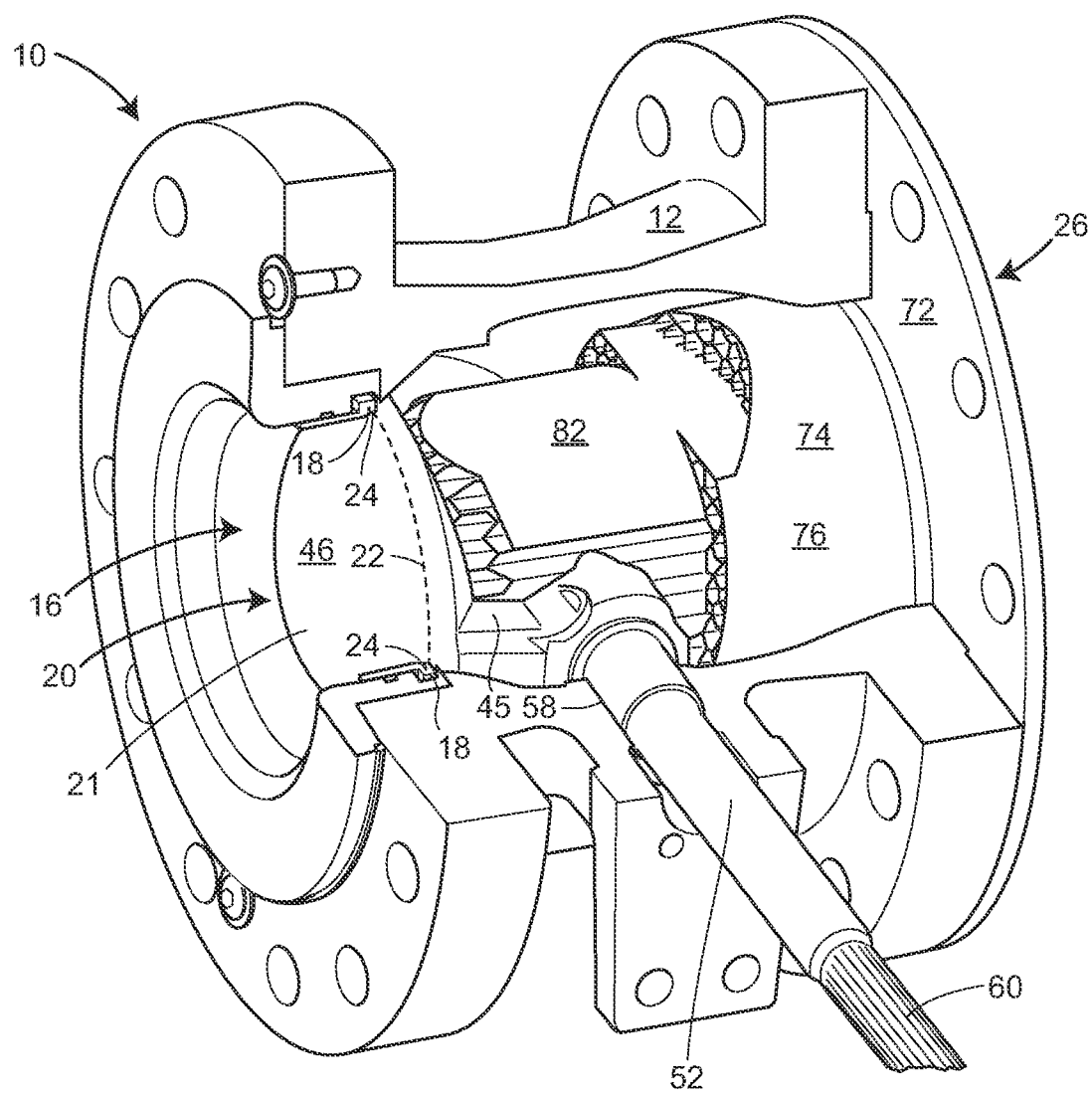
FIG. 3 is an isometric and partial sectional view of the embodiment of FIG. 1 with the valve closure member in a closed position.

As illustrated in FIG. 1, a valve assembly 10 includes a valve body 12 defining an inlet 16 and an outlet 14. A valve seat 18 (which is illustrated in FIGS. 2 and 3 but omitted for clarity in FIGS. 1, 4, and 12) is defined by or coupled to the valve body 12 between the inlet 16 and the outlet 14. A valve closure member 20 is coupled to the valve body 12, and the valve closure member 20 is displaceable relative to the valve body 12 between a first closed position (illustrated in FIGS. 3 and 4) and a second fully-open position (illustrated in FIGS. 1 and 2). In the first closed position illustrated in FIG. 3, a sealing portion 22 (indicated as a dashed line) of the valve closure 20 member sealingly engages a sealing portion 24 of the valve seat 18 to prevent flow of a fluid from the inlet 16 of the valve body 12 to the outlet 14 of the valve body 12. In the second fully-open position, the sealing portion 22 of the valve closure member 20 is offset from the sealing portion 24 of the valve seat 18 to permit flow of the fluid from the inlet 16 of the valve body 12 to the outlet 14 of the valve body 12.

Figure 5:
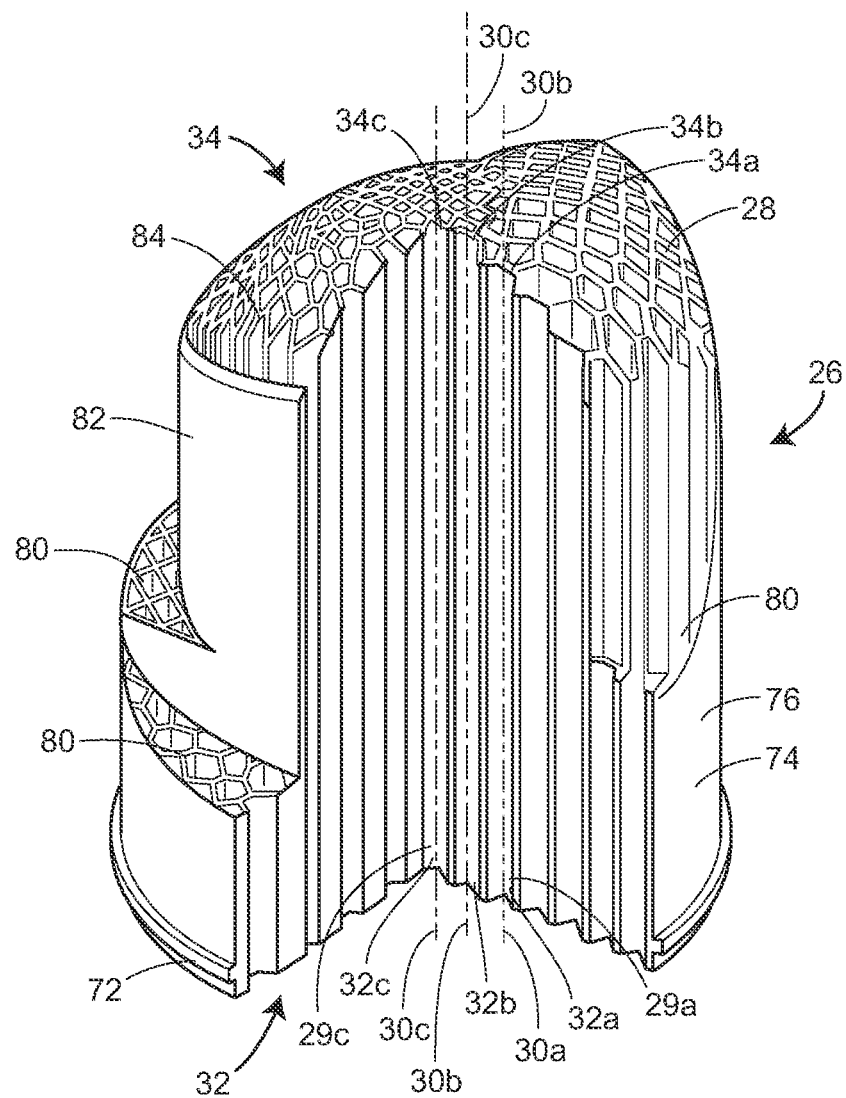
FIG. 5 is an isometric and partial sectional view of an embodiment of an anti-cavitation element.
Figure 6:
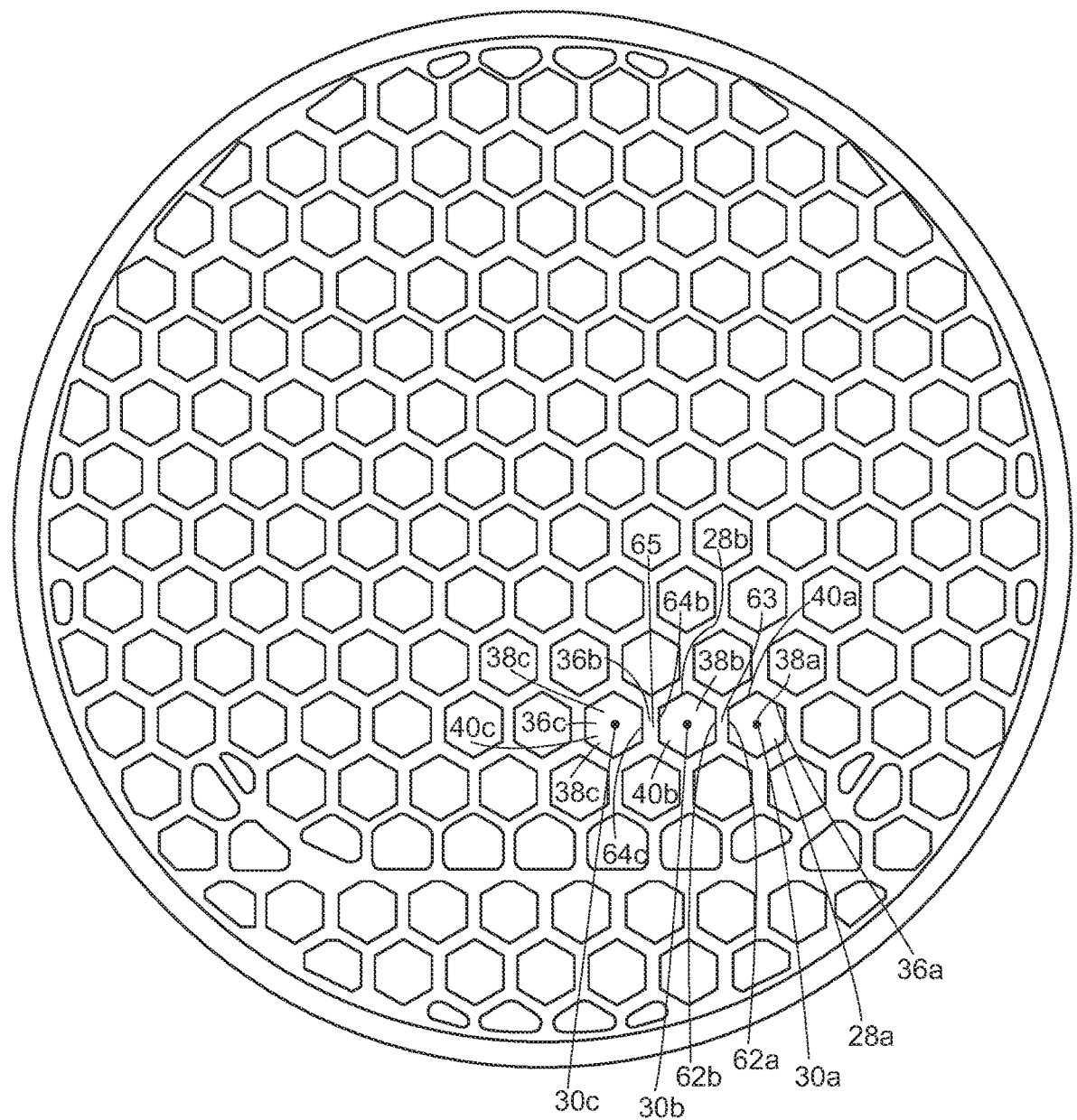
FIG. 6 is a front view of an embodiment of an anti-cavitation element.

As illustrated in FIG. 2, the valve assembly 10 also includes an anti-cavitation element 26, and the anti-cavitation element 26 includes a plurality of hollow tubes 28. As illustrated in FIG. 5, the plurality of hollow tubes 28 includes a first tube 28a extending along a first flow axis 30a from an open first end 32a to an open second end 34a. As illustrated in FIG. 6, the first tube 28a has an inner surface 36a that defines a first flow area 38a, and the inner surface 36a of the first tube 28a has or defines a first cross-sectional shape 40a normal to the first flow axis 30a. As illustrated in FIG. 5, the plurality of hollow tubes 28 includes a second tube 28b extending along a second flow axis 30b from an open first end 32b to an open second end 34b. As illustrated in FIG. 6, the second tube 28b has an inner surface 36b that defines a second flow area 38b, and the inner surface 36b of the second tube 28b has or defines a second cross-sectional shape 40b normal to the second flow axis 30b. As illustrated in FIG. 5, the plurality of hollow tubes 28 includes a third tube 28c extending along a third flow axis 30c from an open first end 32c to an open second end 34c. As illustrated in FIG. 6, the third tube 28c has an inner surface 36c that defines a third flow area 38c, and the inner surface 36c of the third tube 28c has or defines a third cross-sectional shape 40c normal to the third flow axis 30c.

Figure 9:
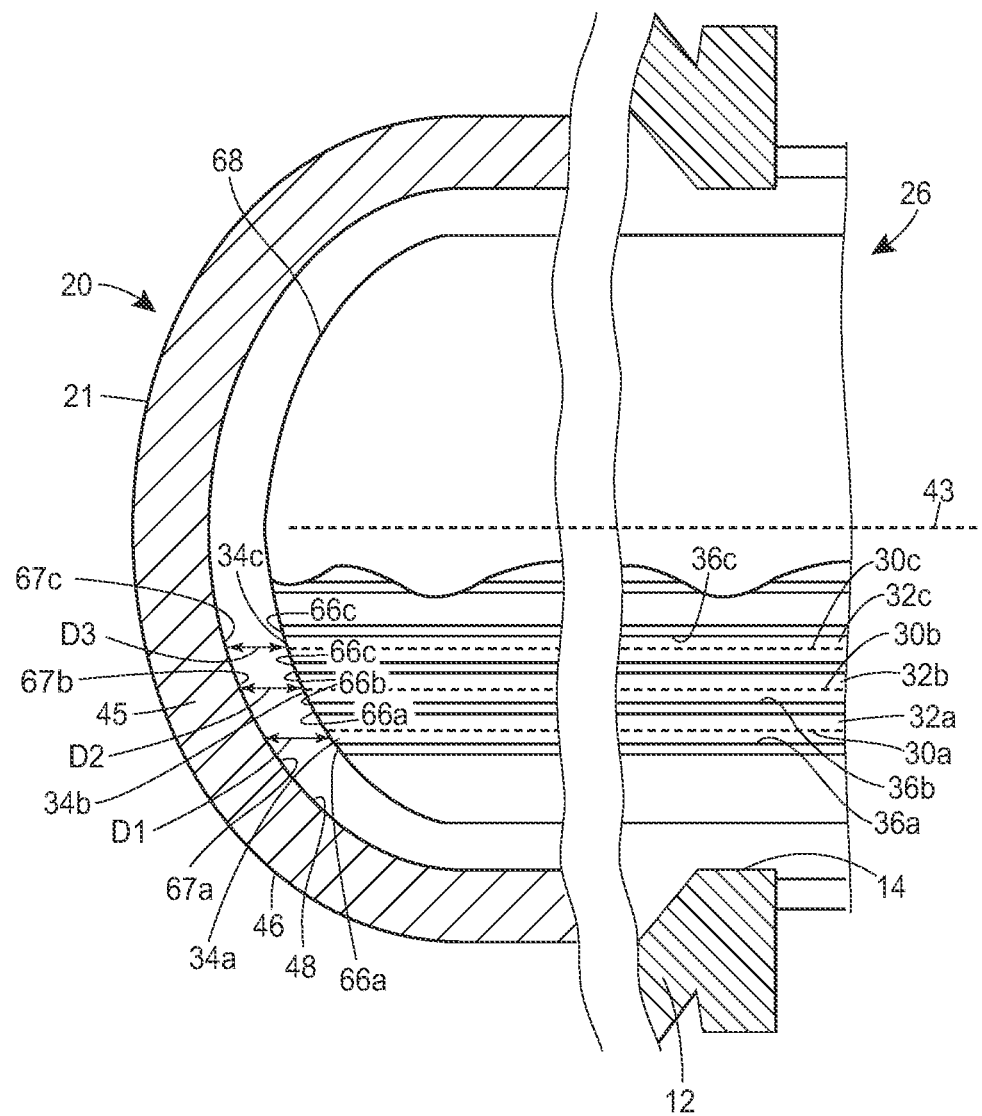
FIG. 9 is a sectional side view of an embodiment of an anti-cavitation element.

As illustrated in FIG. 9, the second end 34a of the first tube 28a is between a portion (e.g., a first portion 67a) of the valve closure member 20 and the first end 32a of first tube 28a along the first flow axis 30a when the valve closure member 20 is in the first closed position. The second end 34b of the second tube 28b is between a portion (e.g., a second portion 67b) of the valve closure member 20 and the first end 32b of second tube 28b along the second flow axis 30b when the valve closure member 20 is in the first closed position. The second end 34c of the third tube 28c is between a portion (e.g., a third portion 67c) of the valve closure member 20 and the first end 32c of third tube 28c along the third flow axis 30c when the valve closure member 20 is in the first closed position. The first tube 28a, the second tube 28b, and the third tube 28c are integrally formed as a single, unitary structure. In some embodiments, the first tube 28a, the second tube 28b, and the third tube 28c may be integrally formed using additive manufacturing techniques and/or three-dimensional printing as will be described in more detail below.

By forming the first tube 28a, the second tube 28b, and the third tube 28c (and in some embodiments, each of the plurality of tubes 28 and/or all of the anti-cavitation element 26) as a single, unitary structure (which may, for example, be formed, created, or fabricated using any of the additive manufacturing processes or techniques that will be described in following paragraphs), the geometry of the cross-sectional shapes 40a, 40b, 40c may be precisely manufactured to optimize flow through the first flow area 38a, the second flow area 38b, and the third flow area 38c, respectively. Such optimized flow geometry is difficult or impossible to achieve using conventional machining/casting processes. The optimized flow geometry results in walls between adjacent flow areas that are thinner—and stronger—than conventional tubes, thereby reducing material cost.

Due to the thinner walls and/or optimized geometry, the number of flow passages can be increased in the same area, and therefore the flow capacity of the fluid flowing through the anti-cavitation element 26 is increased. The optimized geometry allows the overall shape of the anti-cavitation element 26 to be precisely controlled so as to allow tubes 28 to be disposed behind the "ears" of the ball. The optimized geometry also may act to stage the pressure drop through the tubes 28 by, for example, expansion of the flow areas 38 and/or diffusion and communication to other flow areas 38 with a larger volume. In addition, the unitary anti-cavitation element 26 is (or portions of the unitary anti-cavitation element 26 are) necessarily formed as an assembly, thereby reducing the production cost to secure each of the plurality of tubes of a conventional anti-cavitation device bundled and positioned within a shroud. The material may also result in a substantial reduction in weight of the anti-cavitation element 26 as opposed to conventional devices. The material may be corrosion resistant and may therefore not require a further manufacturing step.

Turning to the valve assembly 10 in more detail, FIG. 1 illustrates an embodiment of the valve body 12 that defines the inlet 16 and the outlet 14, and the inlet 16 and the outlet 14 may each extend along a body longitudinal axis 43. An inlet flange 44 may be disposed at a first end portion of the valve body 12 at or adjacent to the inlet 16 of the valve body 12, and the inlet flange 44 may be adapted to connect the inlet 16 to a portion of upstream pipe (not shown) in any known manner. An outlet flange 42 may be disposed at a second end portion of the valve body 12 at or adjacent to the outlet 14 of the valve body 12, and the outlet flange 42 may be adapted to connect the outlet 14 to a portion of downstream pipe (not shown) in any known manner. The inlet flange 44 and the outlet flange 42, as well as the portion of the valve body 12 defining the inlet 16 and the outlet 14 may be symmetrically formed about the body longitudinal axis 43. In the disclosed embodiment, fluid may flow through the valve body 12 from the inlet 16 to the outlet 14 or from the outlet 14 to the inlet 16.

The valve seat 18 (which is illustrated in FIGS. 2 and 3 but omitted for clarity in FIGS. 1, 4, and 12) may be disposed between the inlet 16 and the outlet 14 and may have an annular shape that may be symmetrically formed about the body longitudinal axis 43. All or a portion of the valve seat 18 may be integrally formed with the valve body 12, or all or a portion of the valve seat 18 may be coupled to the valve body 12. As illustrated in FIG. 3, the valve seat 18 may include the sealing portion 24 which may have an annular shape and may be adapted to sealingly engage the sealing portion 22 of the valve closure member 20 when the valve closure member 20 is in the first closed position of FIG. 3. All or a portion of the sealing portion 24 may be a made from a resilient material or from a rigid material.

Figure 12:
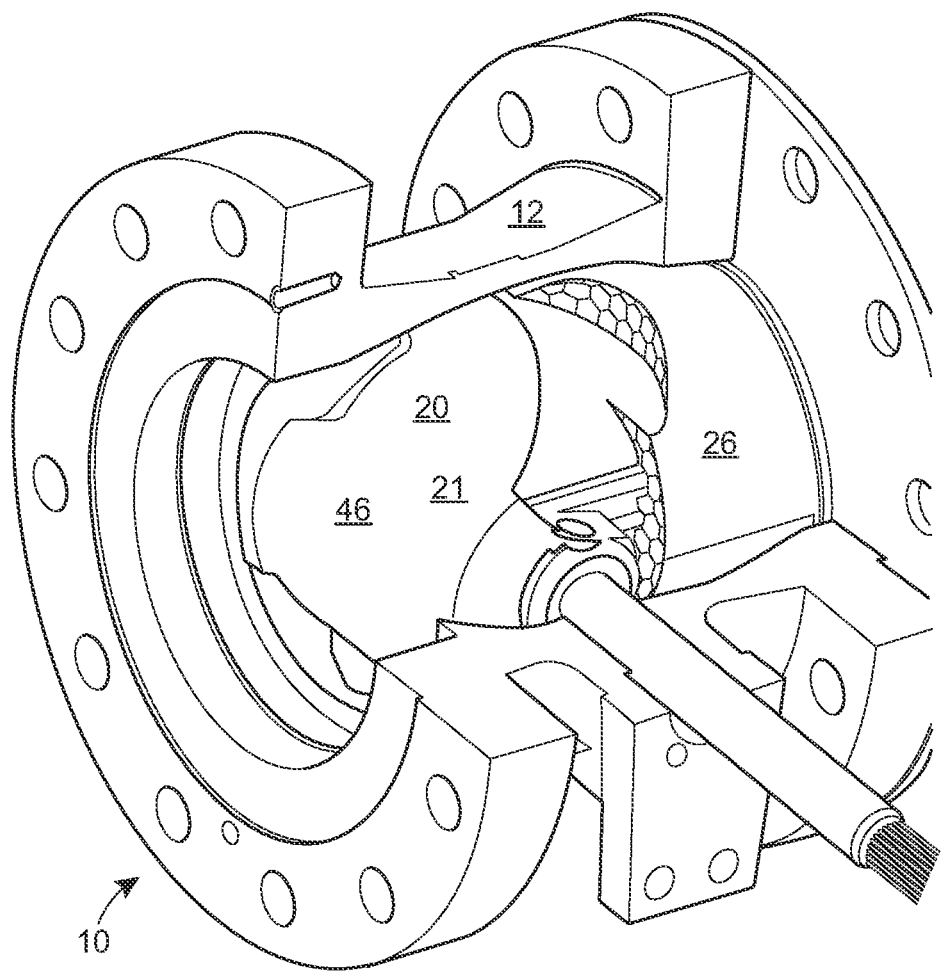
FIG. 12 is an isometric and partial sectional view of the embodiment of FIG. 1 with the valve closure member in a partially-open position.

The valve closure member 20 is coupled to the valve body 12, and the valve closure member 20 is displaceable relative to the valve body 12 between the first closed position (illustrated in FIGS. 3 and 4) and the second fully-open position (illustrated in FIGS. 1 and 2). The valve closure member 20 may also displace to a third partially-open position between the first closed position and the second fully-open position, as illustrated in FIG. 12.

Figure 4:
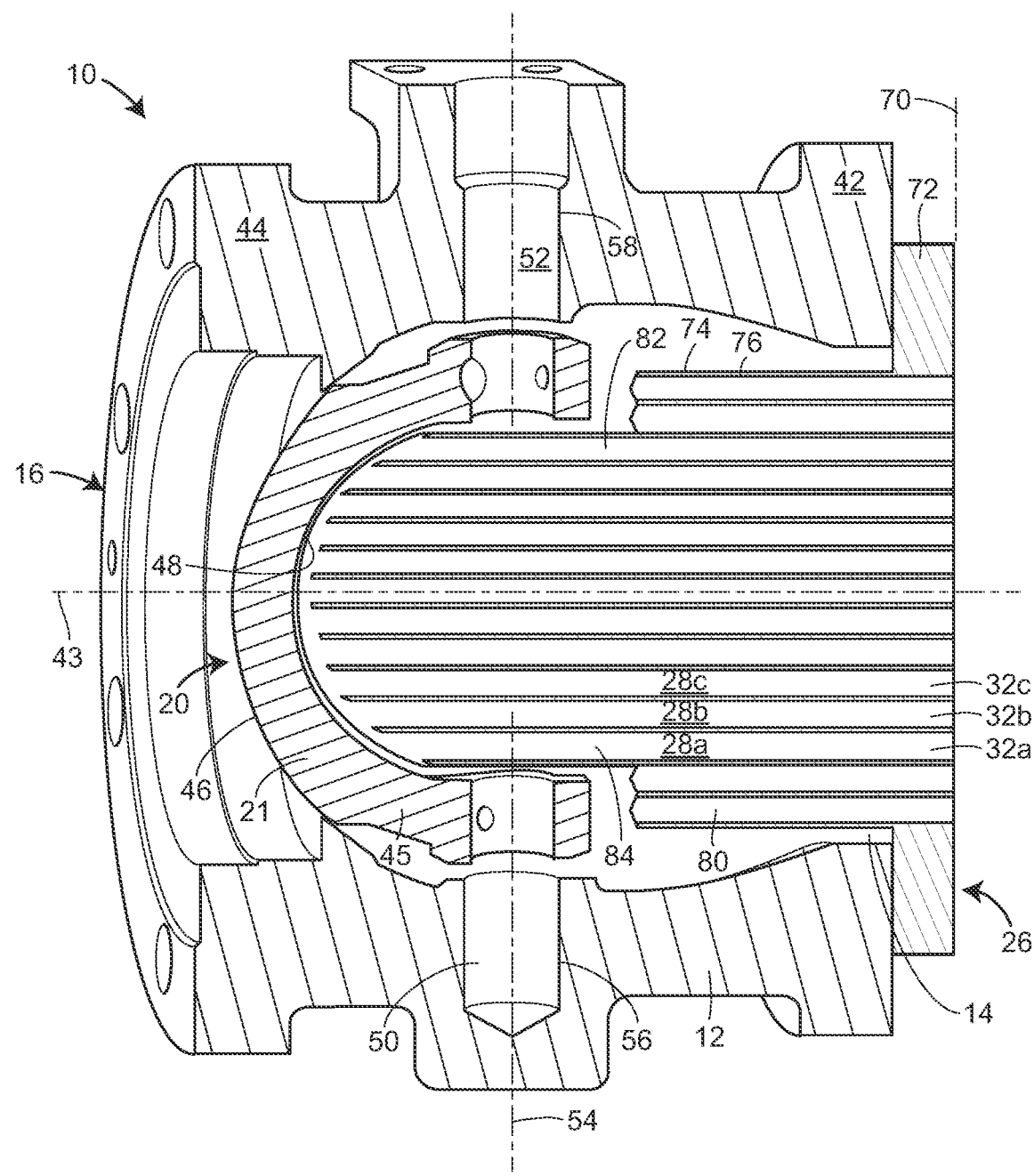
FIG. 4 is an partial sectional top view of the embodiment of FIG. 3.

The valve closure member 20 may have any shape and/or configuration to prevent fluid from flowing from the inlet 16 to the outlet 14 (or from the outlet 14 to the inlet 16) when in the first closed position and to allow fluid to flow from or between the inlet 16 to the outlet 14 (or between the outlet 14 to the inlet 16) when in the second fully-open position. For example, as illustrated in FIG. 4, the valve closure member 20 may be a ball member 21 having a ball member body 45 having a convex sealing surface 46. The sealing surface 46 may have any suitable shape such that the sealing portion 22 of the valve closure member 20 sealingly engages the sealing portion 24 of the valve seat 18 (to prevent flow of the fluid from the inlet 16 to the outlet 14, or vice versa) when the valve closure member 20 is in the first closed position. For example, the sealing surface 46 may have (or substantially have) a shape of a partial sphere. The ball member body 45 may also have a concave inner surface 48 that may be opposite to the convex sealing surface 46, and the inner surface 48 may correspond in shape to the sealing surface 46 such that all or portions of the ball member body 45 may have a uniform or substantially uniform cross-sectional thickness. For example, the inner surface 48 may have (or substantially have) a shape of a partial sphere having a smaller radius than the sealing surface 46.

Still referring to FIG. 4, the ball member 21 may also have a first stem portion 50 and a second stem portion 52 extending along a pivot axis 54, and the first stem portion 50 and the second stem portion 52 may each be coupled to a portion of the ball member body 45. The first stem portion 50 may extend into a blind bore 56 formed in the valve body 12 and an intermediate portion of the second stem portion 52 may extend through a stem aperture 58 formed through the valve body 12 such that an end portion 60 of the second stem portion 52 is disposed exterior to the valve body 12. The end portion 60 of the second stem portion 52 may be adapted to be coupled to a valve actuator (not shown), and the valve actuator may be any suitable actuator capable or rotating the valve closure member 20 between the first closed position and the second fully-open position. The pivot axis 54 may extend normal to the body longitudinal axis 43 and may intersect the body longitudinal axis 43.

When the valve closure member 20 (e.g., the ball member 21) is in the first closed position as illustrated in FIG. 3, the convex sealing surface 46 of the ball member 21 may be positioned relative to the valve seat 18 such that the sealing portion 22 of the ball member 21 sealingly engages the sealing portion 24 of the valve seat 18. To displace the ball member 21 to the second fully-open position illustrated in FIG. 1, the actuator (not shown) rotates the second stem portion 52 about the pivot axis 54 a suitable rotational distance (e.g., 90 degrees) such that the entire sealing surface 46 of the ball member 21 may be disposed away from the valve seat 18 and such that no portion of the ball member 21 obstructs or substantially obstructs fluid flow from the inlet 16 to the outlet 14 (or vice versa). Said another way, in the second fully-open position, the sealing portion 22 of the ball member 21 does not sealingly engage the sealing portion 24 of the valve seat 18, thereby allowing fluid to flow from the inlet 16 to the outlet 14 (or vice versa). In some embodiments, when fluid flows from the outlet 14 to the inlet 16, fluid pressure against the inner surface 48 of the ball member 21 when the ball member 21 is in the first closed position (and when fluid flows from the inlet 16 to the outlet 14) provides additional force when the sealing portion 22 of the ball member 21 is in sealing engagement with the sealing portion 24 of the valve seat 18.

To displace the ball member 21 to the third partially-open position, the actuator (not shown) rotates the second stem portion 52 about the pivot axis 54 a suitable rotational distance (e.g., 30 degrees to 60 degrees) such that a portion of the entire sealing surface 46 of the ball member 21 may be disposed away from the valve seat 18 but that a portion of the ball member 21 obstructs or substantially obstructs fluid flow from the inlet 16 to the outlet 14 (or vice versa). One having ordinary skill in the art would recognize that fluid flow can be regulated from the inlet 16 to the outlet (or vice versa) by rotating the ball member 21 a desired rotational distance about the pivot member between the first closed position and the second fully-open position.

In some embodiments, the ball member 21 (e.g., the ball member body 45) may also translate along the body longitudinal axis 43 (e.g., by a cam action that is not shown) such that the sealing portion 22 of the ball member 21 sealingly engages the sealing portion 24 of the valve seat 18 when the ball member 21 is in the first closed position.

As illustrated in FIG. 2, the valve assembly 10 also includes the anti-cavitation element 26 that includes the plurality of hollow tubes 28. The anti-cavitation element 26 may include any suitable number of tubes 28 to reduce or eliminate cavitation in fluid flowing from the inlet 16 to the outlet 14 (or vice versa) of the valve body 12. For example, as illustrated in FIG. 5, the plurality of hollow tubes 28 includes the first tube 28a, the second tube 28b, and the third tube 28c. Any number of additional tubes 28 may be included, such as a fourth tube, fifth tube, sixth tube, etc.

Referring to FIG. 9, the first tube 28a may extend along the first flow axis 30a from the open first end 32a to the open second end 34a, and the first flow axis 30a may be linear and parallel to the body longitudinal axis 43. The inner surface 36a that defines the first flow area 38a (or defining an aperture that defines the first flow area 38a) may have any suitable first cross-sectional shape 40a (see FIG. 6) or combination of shapes normal to the first flow axis 30a. In some embodiments, the first cross-sectional shape 40a may be uniform from the first end 32a to the second end 34a of the first tube 28*a*. In other embodiments, the first cross-sectional shape 40*a* may vary from the first end 32*a* to the second end 34*a* of the first tube 28*a*.

Figure 7:
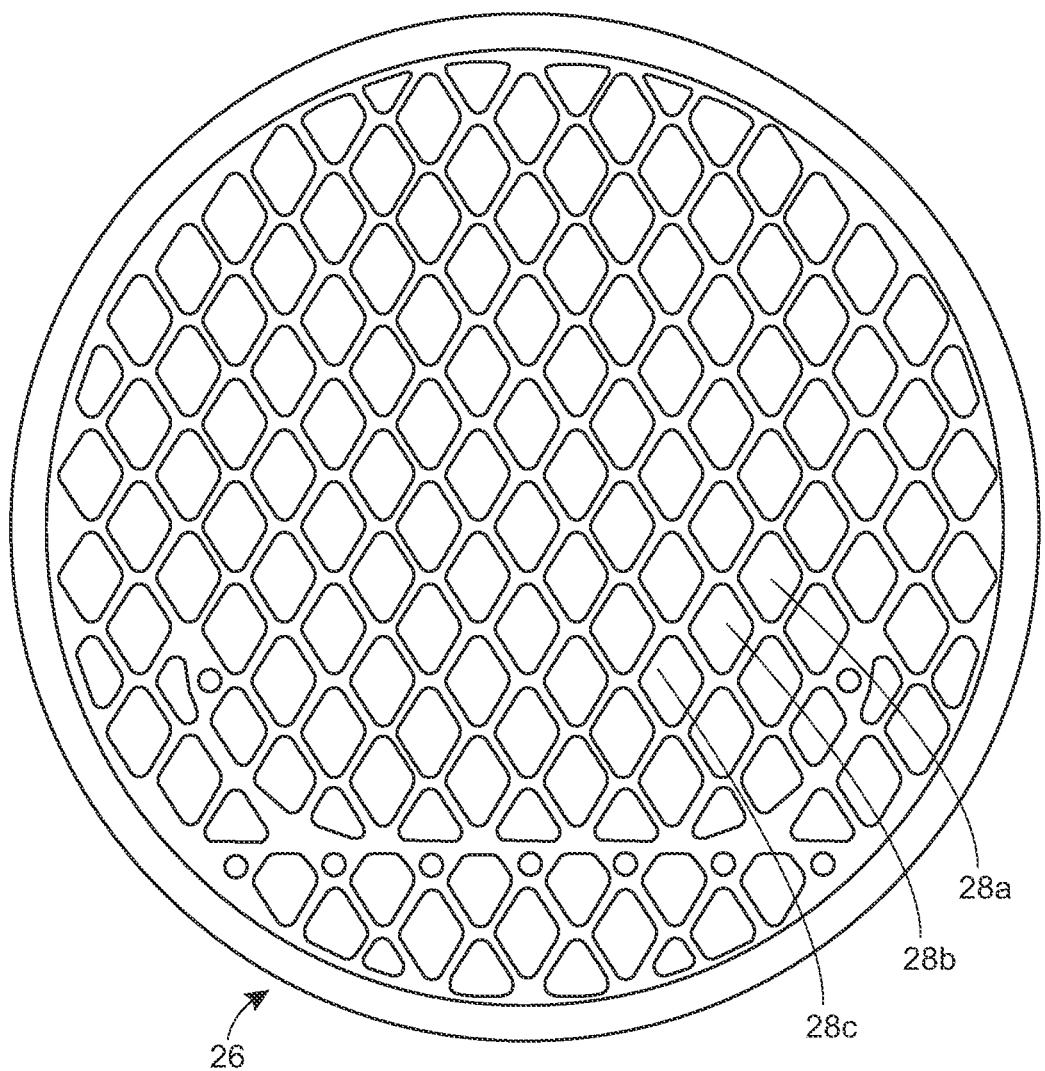
FIG. 7 is a front view of an embodiment of an anti-cavitation element.
Figure 8:
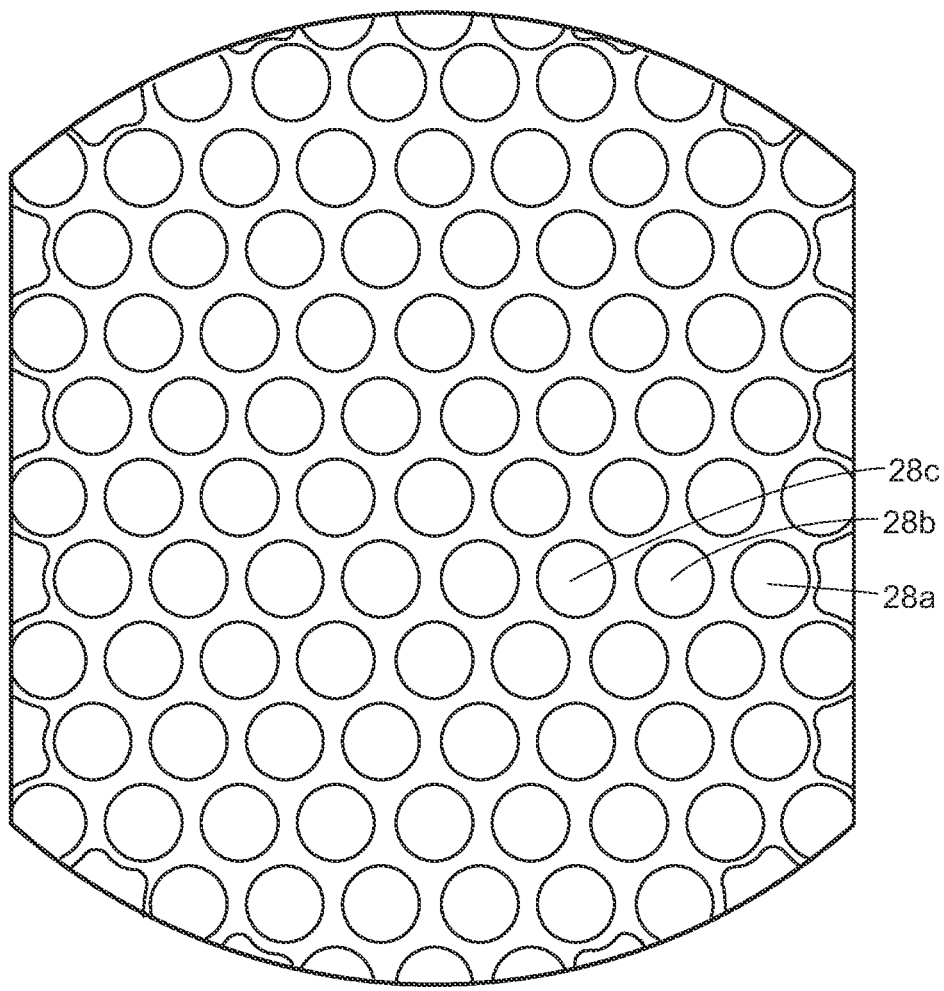
FIG. 8 is a front view of an embodiment of an anti-cavitation element.

As illustrated in FIG. 6, the first cross-sectional shape 40*a* may be a non-circular shape, such as a polygonal shape. The polygonal shape may be a hexagon (as illustrated in FIGS. 6 and 13B), a diamond/rhombus shape (as illustrated in FIGS. 7 and 13A), or a pentagon shape (not shown), for example. Such polygonal shapes (particularly the diamond/rhombus shape or the hexagonal shape) may increase flow through the tubes 28 by increasing the flow area 38, while minimizing material and maximizing structural integrity. In other embodiments, the first cross-sectional shape 40*a* may be a circular shape (as illustrated in FIG. 8) or an oval shape.

As illustrated in FIG. 9, the plurality of hollow tubes 28 includes the second tube 28*b* extending along the second flow axis 30*b* from the open first end 32*b* to an open second end 34*b*. In some embodiments, the second flow axis 30*b* may be linear and parallel to the first flow axis 30*a* and/or the body longitudinal axis 43. As illustrated in FIG. 6, the inner surface 36*b* that defines the second flow area 38*b* (or defining an aperture that defines the second flow area 38*b*) may have any suitable second cross-sectional shape 40*b* (or combination of shapes) normal to the second flow axis 30*b*. In some embodiments, the second cross-sectional shape 40*b* (or the second cross-sectional shapes 40*b*) may be identical to the first cross-sectional shape(s) 40*a*, and the corresponding dimensions of the second cross-sectional shape(s) 40*b* may be identical to those of the first cross-sectional shape(s) 40*a* such that an area of the second cross-sectional shape(s) 40*b* (e.g., the second flow area 38*b*) may be equal to an area the first cross-sectional shape(s) 40*a* (e.g., the first flow area 38*a*). In other embodiments, the second cross-sectional shape 40*b* may be identical to the first cross-sectional shape 40*a*, but one or more of the corresponding dimensions of the second cross-sectional shape 40*b* may be greater than (or less than) those of the first cross-sectional shape 40*a* such that the area of the second cross-sectional shape 40*b* may be different than the area the first cross-sectional shape 40*a*.

In some embodiments (not shown), the second cross-sectional shape(s) 40*b* may not be identical to the first cross-sectional shape(s) 40*a*. In such embodiments, the second cross-sectional shape 40*b* may be uniform from the first end 32*b* to the second end 34*b* of the second tube 28*b*. In other embodiments, the second cross-sectional shape 40*b* may vary from the first end 32*a* to the second end 34*a* of the second tube 28*b*. As illustrated in FIG. 6, the second cross-sectional shape 40*b* may be a non-circular shape, such as a polygonal shape. The polygonal shape may be a hexagon, a diamond/rhombus shape (as illustrated in FIG. 7), or a pentagon shape (not shown), for example. In other embodiments, the first cross-sectional shape 40*a* may be a circular shape (as illustrated in FIG. 8) or an oval shape.

As illustrated in FIG. 9, the plurality of hollow tubes 28 includes the third tube 28*c* extending along the third flow axis 30*c* from the open first end 32*c* to an open second end 34*c*. In some embodiments, the third flow axis 30*c* may be linear and parallel to the first flow axis 30*a* and/or the second flow axis 30*b*. As illustrated in FIG. 6, the inner surface 36*c* that defines the third flow area 38*c* (or defining an aperture that defines the third flow area 38*c*) may have any suitable third cross-sectional shape 40*c* (or combination of shapes) normal to the third flow axis 30*c*. In some embodiments, the third cross-sectional shape 40*c* (or the third cross-sectional shapes 40*c*) may be identical to the first cross-sectional shape(s) 40*a* and/or the second cross-sectional shape(s) 40*b*. Accordingly, the corresponding dimensions of the third cross-sectional shape(s) 40*c* may be identical to those of the first cross-sectional shape(s) 40*a* and/or the second cross-sectional shape(s) 40*b* such that an area of the third cross-sectional shape(s) 40*c* may be equal to the area the first cross-sectional shape(s) 40*a* and/or the area of the second cross-sectional shape(s) 40*b*. In other embodiments, the third cross-sectional shape 40*c* may be identical to the first cross-sectional shape(s) 40*a* and/or the second cross-sectional shape(s) 40*b*, but one or more of the corresponding dimensions of the second cross-sectional shape(s) 40*b* may be greater than (or less than) one or more of the first cross-sectional shape(s) 40*a* and/or the second cross-sectional shape(s) 40*b* such that an area of the third cross-sectional shape(s) 40*c* may be different than the area the first cross-sectional shape 40*a* and/or the area of the second cross-sectional shape(s) 40*b*.

In some embodiments (not shown), the third cross-sectional shape(s) 40*c* may not be identical to the first cross-sectional shape(s) 40*a* and/or the second cross-sectional shape(s) 40*b*. In such embodiments, the third cross-sectional shape 40*c* may be uniform from the first end 32*c* to the second end 34*c* of the third tube 28*c*. In other embodiments, the third cross-sectional shape 40*c* may vary from the first end 32*c* to the second end 34*c* of the third tube 28*c*. As illustrated in FIG. 6, the third cross-sectional shape 40*c* may be a non-circular shape, such as a polygonal shape. The polygonal shape may be a hexagon (as illustrated in FIG. 6), a diamond/rhombus shape (as illustrated in FIG. 7), or a pentagon shape (not shown), for example. In other embodiments, the third cross-sectional shape 40*c* may be a circular shape (as illustrated in FIG. 8) or an oval shape.

As illustrated in FIG. 6, the inner surface 36*a* of the first tube 28*a* may be partially defined by a first portion 62*a* and the inner surface 36*b* of the second tube 28*b* may be partially defined by a first portion 62*b*, and a first wall portion 63 may be defined by the first portion 62*a* of the inner surface 36*a* of the first tube 28*a* and the first portion 62*b* of the inner surface 36*b* of the second tube 28*b*. The first tube 28*a* and the second tube 28*b* may share, and may be separated by, the first wall portion 63. The inner surface 36*b* of the second tube 28*b* may be further partially defined by a second portion 64*b* and the inner surface 36*c* of the third tube 28*c* may be partially defined by a first portion 64*c*, and a second wall portion 65 may be defined by the second portion 64*b* of the inner surface 36*b* of the second tube 28*b* and the first portion 64*c* of the inner surface 36*c* of the third tube 28*c*. The third tube 28*c* and the second tube 28*b* may share, and may be separated by, the second wall portion 65.

As previously explained, any number of additional tubes 28 may be included in the plurality of tubes 28 (e.g., a fourth tube, fifth tube, sixth tube, etc.) Any and all of the additional tubes 28 may extend along a corresponding (e.g., a fourth, fifth, sixth, etc.) flow axis 30 from an open first end 32 to an open second end 34, and the corresponding flow axis 30 may be parallel to the body longitudinal axis 43. A corresponding (e.g., a fourth, fifth, sixth, etc.) inner surface 36 that defines a corresponding (e.g., a fourth, fifth, sixth, etc.) flow area 38 (or defining an aperture that defines the corresponding flow area 38*a*) may have any suitable first cross-sectional shape(s) 40 (or combination of shapes) normal to the corresponding flow axis 30, such as any of the shapes described in the discussion of the first tube 28*a*, second tube 28*b*, and/or third tube 28*c*.

As illustrated in FIG. 9, the second end 34*a* of the first tube 28*a* may be between a portion (e.g., a first portion 67*a*) of the valve closure member 20 (e.g., the ball member 21) and the first end 32*a* of first tube 28*a* along the first flow axis 30*a* when the valve closure member 20 is in the first closed position. The second end 34*b* of the second tube 28*b* may be between a portion (e.g., a second portion 67*b*) of the valve closure member 20 and the first end 32*b* of second tube 28*b* along the second flow axis 30*b* when the valve closure member 20 is in the first closed position. The second end 34*c* of the third tube 28*c* may be between a portion (e.g., a third portion 67*c*) of the valve closure member 20 and the first end 32*c* of third tube 28*c* along the third flow axis 30*c* when the valve closure member 20 is in the first closed position. In some embodiments, the first end 32*a* of first tube 28*a*, the first end 32*b* of second tube 28*b*, and the first end 32*c* of third tube 28*c* are each disposed within the outlet 14 (or a portion of the outlet 16) of the valve body 12. In some embodiments, the second end 34*a* of first tube 28*a*, the second end 34*b* of second tube 28*b*, and the second end 34*c* of third tube 28*c* are each disposed within the outlet 14 (or a portion of the outlet 14, such as a portion of the outlet adjacent to the valve seat 18) of the valve body 12.

Because the concave inner surface 48 of the ball member body 45 of the ball member 21 may have (or substantially have) a shape of a partial sphere or a segment or portion of a sphere, a first distance D1 (illustrated in FIG. 11) along the first flow axis 30*a* between the first portion 67*a* of the ball member 21 and the second end 34*a* of the first tube 28*a* may be equal to (or substantially equal to) a second distance D2 along the second flow axis 30*b* between the second portion 67*b* of the ball member 21 and the second end 34*b* of the second tube 28*b*. Similarly, a third distance D3 along the third flow axis 30*c* between the third portion 67*c* of the ball member 21 and the second end 34*c* of the third tube 28*c* may be equal to (or substantially equal to) the first distance D1 and/or the second distance D2. In addition, a corresponding distance along a corresponding flow axis 30 between a corresponding portion 67 of the ball member 21 and the second end 34 of a corresponding additional tube(s) 28 may be equal to (or substantially equal to) the first distance D1 and/or the second distance D2. To determine the first, second, and third distance D1, D2, D2, the position of the second end 34*a*, 34*b*, 34*c* of the first, second, and third tube 28*a*, 28*b*, 28*c* is determined at the intersection of the first, second, and third flow axis 30*a*, 30*b*, 30*c* and the second end 34*a*, 34*b*, 34*c* when viewed in cross-section normal to the first, second, and third flow axis 30*a*, 30*b*, 30*c*.

Figure 11:
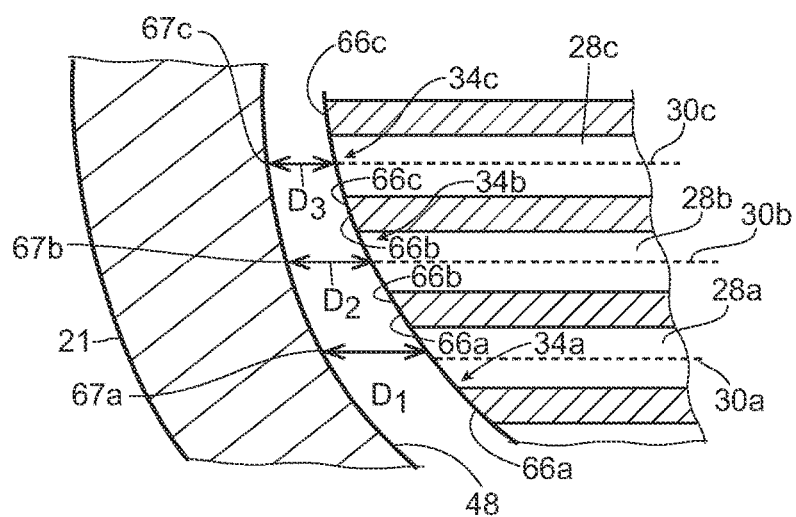
FIG. 11 is a partial sectional side view of an embodiment of an anti-cavitation element.

In such an embodiment, as illustrated in FIG. 11, the second end 34*a* of the first tube 28*a* is at least partially defined by an annular first front surface 66*a*, the second end 34*b* of the second tube 28*b* is at least partially defined by an annular second front surface 66*b*, and the second end 34*c* of the third tube 28*c* is at least partially defined by an annular third front surface 66*c*. The second end of any number of additional tubes 28 may also have a corresponding front surface 66. The first front surface 66*a*, the second front surface 66*b*, and the third front surface 66*c* (and any number of additional front surfaces) may cooperate to form a shape that is non-planar and that may corresponds to a portion of a the shape to the concave inner surface 48 of the ball member body 45 of the ball member 21 when the ball member 21 is in the first closed position. For example, the first front surface 66*a*, the second front surface 66*b*, and the third front surface 66*c* (and any number of additional front surfaces) may cooperate to form a shape that is a portion of a sphere that may corresponds to a portion of a sphere of the concave inner surface 48 of the ball member 21 when the ball member 21 is in the first closed position.

So configured, the first distance D1, the second distance D2, and/or the third distance D3 is minimized while allowing the ball member 21 to move from the first closed position to the second fully-open position. The minimization of the distance between the second end 34*a*, 34*b*, and 34*c* of the first, second, and third tubes 28*a*, 28*b*, 28*c* and the concave inner surface 48 of the ball member 21 allows the first, second, and third tubes 28*a*, 28*b*, 28*c* to extend for longer distances, which improves flow properties.

As illustrated in FIG. 13C, manufacturing processes of conventional anti-cavitation devices resulted in squared-off (i.e., normal to a flow axis) front surfaces 79 of the second ends 80 of the plurality of tubes 82, and these front surfaces 79 did not cooperate to form a shape that is a portion of a sphere to corresponds to a portion of a concave inner surface of the ball member when the ball member is in the first closed position. Therefore, in these known devices, the minimization of the distance between the second ends 80 of the tubes 82 and the concave inner surface of the ball member was not possible or was cost-prohibitive.

As illustrated in FIG. 4, the first end 32*a* of first tube 28*a*, the first end 32*b* of second tube 28*b*, and the first end 32*c* of third tube 28*c* may be aligned along a reference plane 70 extending normal to the first flow axis 30*a* and/or the body longitudinal axis 43. The reference plane 70 may be disposed at or intersect a portion of an annular flange 72 disposed around the plurality of hollow tubes 28. The flange 72 may be connected to the inlet flange 44 and/or a flange of a portion of upstream pipe (not shown) to secure the anti-cavitation element 26 to the valve body 12 and/or the upstream pipe. In some embodiments, the anti-cavitation element 26 may not include a flange 72 and may instead be inserted into or adjacent to the inlet 16 and/or the outlet 14.

Figure 10:
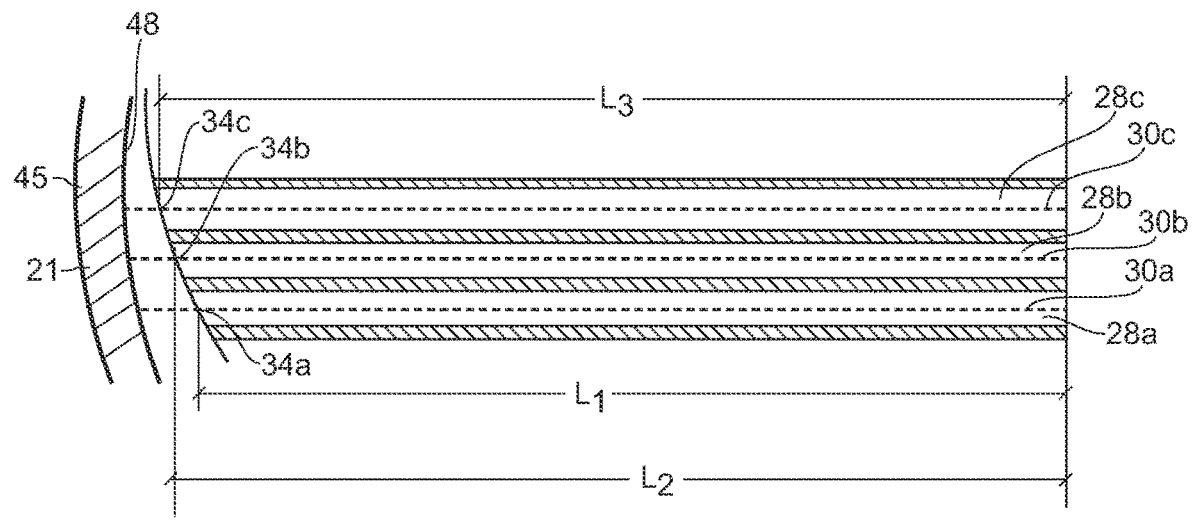
FIG. 10 is a sectional side view of an embodiment of an anti-cavitation element.

As illustrated in FIG. 10, a first distance L1 extends along the first flow axis 30*a* from the first end 32*a* to the second end 34*a* of the first tube 28*a*, and a second distance L2 extends along the second flow axis 30*b* from the first end 32*b* to the second end 34*b* of the second tube 28*b*. A third distance L3 extends along the third flow axis 30*c* from the first end 32*c* to the second end 34*c* of the third tube 28*c*. The first distance L1 may be less than the second distance L2, and the second distance L2 may be less than the third distance L3.

As illustrated in FIG. 5, the plurality of tubes 28 of the anti-cavitation element 26 may be laterally bounded by an imperforate circumferential wall 74 that may have a first portion 76 (that may be cylindrical or partially-cylindrical) that is disposed adjacent to the flange 72. The first portion 76 may be symmetrically formed about the body longitudinal axis 43 (see FIG. 4) or a portion of the first portion 76 may be symmetrically formed about the body longitudinal axis 43. The first portion 76 may bound or surround one or more outer groups 80 of the plurality of tubes 28.

Still referring to FIG. 5, the circumferential wall 74 may also have a second portion 82 (that may be cylindrical or partially-cylindrical) that may extend from the first portion 76 away from the flange 72 (or from the first end 32 of the tubes 28). The second portion 82 may be symmetrically formed about the body longitudinal axis 43 (see FIG. 4) or a portion of the second portion 82 may be symmetrically formed about the body longitudinal axis 43. The second portion 82 (or the cylindrical portion of the second portion 82) may have a diameter that is less than a diameter of the cylindrical portion of the first portion 76. The second portion 82 may bound or surround an inner group 84 of the plurality of tubes 28, and the first tube 28*a*, second tube 28*b*, and third tube 28*c* may be included in the inner group 84. In some embodiments, each of the outer group 80 of the plurality of tubes 28 may have a shorter length than any or all of the inner group 84 of the plurality of tubes 28. The lengths and positions of the second ends 34 of the tubes 28 in the outer group 80 may depend upon interior geometry of the valve body 12 and/or the closure member 20. For example, the second ends 34 of some of the tubes 28 in the outer group 80 may be configured to minimized gaps between the second ends 34 and the first stem portion 50 and/or the second stem portion 52 to improve cavitation attenuation.

In some embodiments, the entire anti-cavitation element 26 may be may be integrally formed as a single, unitary structure. That is, the first tube 28a, the second tube 28b, and the third tube 28c (and any additional tubes, such as a fourth tube, fifth tube, sixth tube, etc.) may be integrally formed as a single, unitary structure. The flange 72 and/or circumferential wall 74 may also be integrally formed with the first tube 28a, the second tube 28b, and the third tube 28c (and any number of other tubes 28) to form a single, unitary structure.

In some embodiments, the first tube 28a, the second tube 28b, and the third tube 28c may be integrally formed using an additive manufacturing technique or additive manufacturing process. The additive manufacturing process may be any additive manufacturing process or technology that builds three-dimensional objects by adding successive layers of material on a material. The additive manufacturing process may be performed by any suitable machine or combination of machines. The additive manufacturing process may typically involve or use a computer, three-dimensional modeling software (e.g., Computer Aided Design, or CAD, software), machine equipment, and layering material. Once a CAD model is produced, the machine equipment may read in data from the CAD file and layer or adds successive layers of liquid, powder, sheet material (for example) in a layer-upon-layer fashion to fabricate a three-dimensional object.

The additive manufacturing process may include any of several processes, such as example only, a three-dimensional printing process, a stereolithography ("SLA") process, a fused deposition modeling ("FDM") process, multi-jet modeling ("MJM") process, and a selective laser sintering ("SLS") process. In some embodiments, the additive manufacturing process may include a laser powder bed fusion process. Any suitable material can be used to form the anti-cavitation element 26, such as a high-strength and low-weight material, such as a metal or metallic material.

In some embodiments, two or more portions of the anti-cavitation element 26 may be fabricated using additive manufacturing processes, and the two or more portions of the anti-cavitation element 26 may be coupled (e.g., by welding) to form the anti-cavitation element 26.

In use, all or a portion of the anti-cavitation element 26 may be disposed in the outlet 14 of the valve body 12, such as by connecting the flange 72 to the outlet flange 42 of the valve body 12 and/or a flange of a portion of downstream pipe (not shown) to secure the anti-cavitation element 26 to the valve body 12 and/or the downstream pipe. In other embodiments, when the anti-cavitation element 26 has no flange 72, all or a portion of the anti-cavitation element 26 may be disposed in the outlet 14 of the valve body 12 and the anti-cavitation element 26 may be coupled or supported in the outlet 14 and/or a portion of downstream pipe (not shown) to maintain a desired position of the anti-cavitation element 26 relative to the valve body 12 and/or the downstream pipe. One having ordinary skill would recognize that all or a portion of the anti-cavitation device 26 may be instead inserted in the inlet 16 and/or in a portion of upstream pipe (not shown) using any of the methods described above. In addition, two or more anti-cavitation devices 26 (not shown) may be used, such as a first anti-cavitation device 26a disposed on one side of the valve seat 18 and a second anti-cavitation device 26b disposed on the other side of the valve seat 18. The first and second anti-cavitation devices 26a, 26b may be identical or may be different. For example, the flow areas 38 and/or cross-sectional shapes 40 of the tubes 28 of the first anti-cavitation device 26a may differ from the flow areas 38 and/or cross-sectional shapes 40 of the tubes 28 of the second anti-cavitation device 26b to increase total length of tubing for further pressure staging. In some embodiments, the first anti-cavitation device 26a could be disposed in upstream piping and/or the inlet 16 and the second anti-cavitation device 26b could be disposed in downstream piping and/or the outlet 14, and the first anti-cavitation device 26a may have larger flow areas 38 than the second anti-cavitation device 26b to stage pressure drop in the fluid.

While various embodiments have been described above, this disclosure is not intended to be limited thereto. Variations can be made to the disclosed embodiments that are still within the scope of the appended claims.

The invention claimed is:

1. A valve assembly comprising:
a valve body defining an inlet and an outlet;
a valve seat coupled to the valve body;
a valve closure member coupled to the valve body, the valve closure member displaceable relative to the valve body between a first closed position and a second fully-open position, wherein in the first closed position, a sealing portion of the valve closure member sealingly engages a sealing portion of the valve seat to prevent flow of a fluid from the inlet of the valve body to the outlet of the valve body, and in the second fully-open position, the sealing portion of the valve closure member is offset from the sealing portion of the valve seat to permit flow of the fluid from the inlet of the valve body to the outlet of the valve body;
an attenuation element coupled to the valve body and comprising:
a circumferential wall;
a plurality of hollow tubes bounded by the circumferential wall, the plurality of hollow tubes including:
a first tube extending along a first flow axis from an open first end to an open second end, the first tube having an inner surface that defines a first flow area, the inner surface of the first tube having a first cross-sectional shape normal to the first flow axis;
a second tube extending along a second flow axis from an open first end to an open second end, the second tube having an inner surface that defines a second flow area, the inner surface of the second tube having a second cross-sectional shape normal to the second flow axis; and
a third tube extending along a third flow axis from an open first end to an open second end, the third tube having an inner surface that defines a third flow area, the inner surface of the third tube having a third cross-sectional shape normal to the third flow axis,
wherein the second end of the first tube is between a portion of the valve closure member and the first end of the first tube along the first flow axis when the valve closure member is in the first closed position, the second end of the second tube is between a portion of the valve closure member and the first end of second tube along the second flow axis when the valve closure member is in the first closed position, and the second end of the third tube is between a portion of the valve closure member and the first end of third tube along the third flow axis when the valve closure member is in the first closed position, wherein the first tube, the second tube, and the third tube are integrally formed as a single, unitary structure, and wherein a portion of the attenuation element is disposed outside of the valve body.

2. The valve assembly of claim 1, wherein the circumferential wall comprises a first portion and a second portion extending away from the first portion, the first portion having a first diameter and surrounding one or more outer groups of hollow tubes of the plurality of hollow tubes, and the second portion having a second diameter less than the first diameter and surrounding one or more inner groups of hollow tubes of the plurality of hollow tubes.

3. The valve assembly of claim 1, wherein the attenuation element further comprises an annular flange disposed on the circumferential wall at or immediately adjacent an end of the attenuation element and around the plurality of hollow tubes, wherein the annular flange is seated against an external portion of the valve body to couple the attenuation element to the valve body, such that the annular flange is disposed outside of the valve body.

4. The valve assembly of claim 3, wherein the first end of the first tube, the first end of the second tube, and the first end of the third tube are aligned along a reference plane extending normal to the first flow axis, and wherein the reference plane intersects a portion of the annular flange, the annular flange being integrally formed with the first tube, the second tube, and the third tube.

5. The valve assembly of claim 1, wherein the first flow axis, the second flow axis, and the third flow axis are linear.

6. The valve assembly of claim 1, wherein the first cross-sectional shape is constant along the first flow axis from the first end to the second end of the first tube, the second cross-sectional shape is constant along the second flow axis from the first end to the second end of the second tube, and the third cross-sectional shape is constant along the third flow axis from the first end to the second end of the third tube.

7. The valve assembly of claim 1, wherein the first cross-sectional shape, the second cross-sectional shape, and the third cross-sectional shape each has a non-circular shape.

8. The valve assembly of claim 1, wherein the valve closure member is a ball member that rotates along a closing axis between the first closed position and the second fully-open position.

9. The valve assembly of claim 1, wherein a first distance extends along the first flow axis from the first end to the second end of the first tube, a second distance extends along the second flow axis from the first end to the second end of the second tube, and a third distance extends along the third flow axis from the first end to the second end of the third tube, and wherein the first distance is less than the second distance, and the second distance is less than the third distance.

10. The valve assembly of claim 1, wherein the second end of the first tube is at least partially defined by an annular first front surface, the second end of the second tube is at least partially defined by an annular second front surface, and the second end of the third tube is at least partially defined by an annular third front surface, and wherein the first front surface, the second front surface, and the third front surface are each non-planar.

11. An attenuation element adapted for use with a valve assembly having a valve body defining an inlet and an outlet, a valve seat coupled to the valve body between the inlet and the outlet, and a valve closure member coupled to the valve body and displaceable relative to the valve body between a first closed position and a second fully-open position, wherein in the first closed position, a sealing portion of the valve closure member sealingly engages a sealing portion of the valve seat, and in the second fully-open position, the sealing portion of the valve closure member is offset from the sealing portion of the valve seat, the attenuation element comprising:

a circumferential wall;

a plurality of hollow tubes bounded by the circumferential wall, the plurality of hollow tubes including:

a first tube extending along a first flow axis from an open first end to an open second end, the first tube having an inner surface that defines a first flow area, the inner surface of the first tube having a first cross-sectional shape normal to the first flow axis;

a second tube extending along a second flow axis from an open first end to an open second end, the second tube having an inner surface that defines a second flow area, the inner surface of the second tube having a second cross-sectional shape normal to the second flow axis; and a third tube extending along a third flow axis from an open first end to an open second end, the third tube having an inner surface that defines a third flow area, the inner surface of the third tube having a third cross-sectional shape normal to the third flow axis, wherein the second end of the first tube is adapted to be between a portion of the valve closure member and the first end of first tube along the first flow axis when the valve closure member is in the first closed position, the second end of the second tube is adapted to be between a portion of the valve closure member and the first end of second tube along the second flow axis when the valve closure member is in the first closed position, and the second end of the third tube is adapted to be between a portion of the valve closure member and the first end of the third tube along the third flow axis when the valve closure member is in the first closed position, and wherein the first tube, the second tube, and the third tube are integrally formed as a single, unitary structure.

12. The attenuation element of claim 11, wherein the circumferential wall comprises a first portion and a second portion extending away from the first portion, the first portion having a first diameter and surrounding one or more outer groups of hollow tubes of the plurality of hollow tubes, and the second portion having a second diameter less than the first diameter and surrounding one or more inner groups of hollow tubes of the plurality of hollow tubes.

13. The attenuation element of claim 11, wherein a portion of the attenuation element is adapted to be disposed outside of the valve body.

14. The attenuation element of claim 13, wherein the portion of the attenuation element comprises an annular flange disposed on the circumferential wall at or immediately adjacent an end of the attenuation element and around the plurality of hollow tubes, wherein the annular flange is adapted to be seated against an external portion of the valve body to couple the attenuation element to the valve body, such that the annular flange is disposed outside of the valve body.

15. The attenuation element of claim 14, wherein the first end of the first tube, the first end of the second tube, and the first end of the third tube are aligned along a reference plane extending normal to the first flow axis, and wherein the reference plane intersects a portion of the annular flange, the annular flange being integrally formed with the first tube, the second tube, and the third tube.

16. The attenuation element of claim 11, wherein the first cross-sectional shape is constant along the first flow axis from the first end to the second end of the first tube, the second cross-sectional shape is constant along the second flow axis from the first end to the second end of the second tube, and the third cross-sectional shape is constant along the third flow axis from the first end to the second end of the third tube.

17. The attenuation element of claim 11, wherein the first cross-sectional shape, the second cross-sectional shape, and the third cross-sectional shape each has a non-circular shape.

18. The attenuation element of claim 11, wherein a first distance extends along the first flow axis from the first end to the second end of the first tube, a second distance extends along the second flow axis from the first end to the second end of the second tube, and a third distance extends along the third flow axis from the first end to the second end of the third tube, and wherein the first distance is less than the second distance, and the second distance is less than the third distance.

19. The attenuation element of claim 11, wherein the second end of the first tube is at least partially defined by an annular first front surface, the second end of the second tube is at least partially defined by an annular second front surface, and the second end of the third tube is at least partially defined by an annular third front surface, and wherein the first front surface, the second front surface, and the third front surface are each non-planar.

20. A valve assembly comprising:
a valve body defining an inlet and an outlet;
a valve seat coupled to the valve body;
a valve closure member coupled to the valve body, the valve closure member displaceable relative to the valve body between a first closed position and a second fully-open position, wherein in the first closed position, a sealing portion of the valve closure member sealingly engages a sealing portion of the valve seat to prevent flow of a fluid from the inlet of the valve body to the outlet of the valve body, and in the second fully-open position, the sealing portion of the valve closure member is offset from the sealing portion of the valve seat to permit flow of the fluid from the inlet of the valve body to the outlet of the valve body;
an attenuation element coupled to the valve body and comprising:
a circumferential wall;
a plurality of hollow tubes bounded by the circumferential wall, the plurality of hollow tubes including:
a first tube extending along a first flow axis from an open first end to an open second end, the first tube having an inner surface that defines a first flow area, the inner surface of the first tube having a first cross-sectional shape normal to the first flow axis;
a second tube extending along a second flow axis from an open first end to an open second end, the second tube having an inner surface that defines a second flow area, the inner surface of the second tube having a second cross-sectional shape normal to the second flow axis; and
a third tube extending along a third flow axis from an open first end to an open second end, the third tube having an inner surface that defines a third flow area, the inner surface of the third tube having a third cross-sectional shape normal to the third flow axis,
wherein the second end of the first tube is between a portion of the valve closure member and the first end of the first tube along the first flow axis when the valve closure member is in the first closed position, the second end of the second tube is between a portion of the valve closure member and the first end of second tube along the second flow axis when the valve closure member is in the first closed position, and the second end of the third tube is between a portion of the valve closure member and the first end of the third tube along the third flow axis when the valve closure member is in the first closed position,
wherein the first tube, the second tube, and the third tube are integrally formed as a single, unitary structure, and
wherein the circumferential wall comprises a first portion and a second portion extending away from the first portion, the first portion having a first diameter and surrounding one or more outer groups of hollow tubes of the plurality of hollow tubes, and the second portion having a second diameter less than the first diameter and surrounding one or more inner groups of hollow tubes of the plurality of hollow tubes.

* * * * *

UNITED STATES PATENT AND TRADEMARK OFFICE
CERTIFICATE OF CORRECTION

PATENT NO. : 11,187,328 B2
APPLICATION NO. : 16/833046
DATED : November 30, 2021
INVENTOR(S) : Charles R. Kuhlman et al.

Page 1 of 1

It is certified that error appears in the above-identified patent and that said Letters Patent is hereby corrected as shown below:

In the Specification

Column 2, Line 35, "from," should be -- form, --.

Column 2, Line 48, "from," should be -- form, --.

Column 2, Line 62, "is an" should be -- is a --.

Column 3, Line 36, "valve closure 20 member" should be -- valve closure member 20 --.

Column 4, Lines 64-65, "may be disposed be disposed" should be -- may be disposed --.

Column 5, Line 20, "be a" should be -- be --.

Column 5, Line 66, "or" should be -- of --.

Column 9, Line 14, "outlet 16)" should be -- outlet 14) --.

Column 9, Line 57, "a the" should be -- the --.

Column 11, Line 4, "closure" should be -- valve closure --.

Column 11, Line 10, "may be may be" should be -- may be --.

Signed and Sealed this
Twenty-first Day of June, 2022

Katherine Kelly Vidal
*Director of the United States Patent and Trademark Office*